(12) United States Patent
Potier et al.

(10) Patent No.: US 12,348,112 B2
(45) Date of Patent: Jul. 1, 2025

(54) ELECTROMECHANICAL ACTUATOR

(71) Applicant: Goodrich Actuation Systems SAS, Saint Ouen l'Aumone (FR)

(72) Inventors: Karl Potier, Aix en Provence (FR); Maxime Serrand, Paris (FR); Corentin Boitard, Maisons-Laffitte (FR); Raphael Medina, Ecouen (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 364 days.

(21) Appl. No.: 18/151,019

(22) Filed: Jan. 6, 2023

(65) Prior Publication Data
US 2023/0216373 A1 Jul. 6, 2023

(30) Foreign Application Priority Data

Jan. 6, 2022 (EP) ..................................... 22305006

(51) Int. Cl.
*H02K 7/116* (2006.01)
*H01F 7/08* (2006.01)
*H02K 11/21* (2016.01)

(52) U.S. Cl.
CPC ............... *H02K 7/116* (2013.01); *H01F 7/08* (2013.01); *H02K 11/21* (2016.01)

(58) Field of Classification Search
CPC .......... H02K 7/116; H02K 11/21; H01F 7/08; F16D 7/08; F16D 47/00; F16D 13/34; F16D 27/11; B64C 13/50; F16H 21/16
See application file for complete search history.

(56) References Cited

U.S. PATENT DOCUMENTS

| 3,034,619 | A | 5/1962 | Glasgow et al. |
| 8,567,715 | B2 | 10/2013 | Fervel et al. |
| 9,493,230 | B2 * | 11/2016 | Balsiger .................. F16H 37/04 |
| | | | (Continued) |

FOREIGN PATENT DOCUMENTS

| CA | 3028058 A1 | 9/2019 |
| EP | 1411272 A2 | 4/2004 |
| | (Continued) | |

OTHER PUBLICATIONS

European Search Report for Application No. 22305006.3, mailed Jun. 9, 2022, 7 pages.

*Primary Examiner* — Tulsidas C Patel
*Assistant Examiner* — Mohammed Ahmed Qureshi
(74) *Attorney, Agent, or Firm* — CANTOR COLBURN LLP

(57) ABSTRACT

An electromechanical actuator, EMA, having a plurality of modes. The EMA includes a housing, a motor fixed relative to the housing, the motor having an output shaft, the output shaft defining an axis (X) of the EMA and a first sun gear connected for rotation with the output shaft. The system includes an output arranged to be driven by rotation of the first sun gear, wherein the output is arranged to have a neutral position and to be movable away from the neutral position within a positive quadrant and away from the neutral position within a negative quadrant and a ratchet comprising a ratchet wheel and a pawl. The system also has a torque limiter having a predetermined torque limit and arranged to limit torque transfer between the first sun gear and the output.

12 Claims, 5 Drawing Sheets

(56) References Cited

U.S. PATENT DOCUMENTS

| | | | |
|---|---|---|---|
| 9,829,055 B2 | 11/2017 | Defosse et al. | |
| 10,000,275 B2* | 6/2018 | Tendola | B64C 13/341 |
| 10,843,792 B2 | 11/2020 | Avritch et al. | |
| 10,933,979 B2 | 3/2021 | Medina et al. | |
| 2004/0040813 A1* | 3/2004 | Darby | F16D 63/006 |
| | | | 192/46 |
| 2015/0184700 A1 | 7/2015 | Balsiger | |
| 2019/0161172 A1 | 5/2019 | Socheleau et al. | |
| 2020/0255126 A1 | 8/2020 | Medina | |
| 2020/0391846 A1 | 12/2020 | Medina | |

FOREIGN PATENT DOCUMENTS

| | | | |
|---|---|---|---|
| EP | 1411272 A3 | 5/2004 | |
| EP | 2617978 A2 | 7/2013 | |
| EP | 2947005 A1 | 11/2015 | |
| EP | 2617978 A3 | 12/2016 | |
| WO | 9723719 A1 | 7/1997 | |

\* cited by examiner

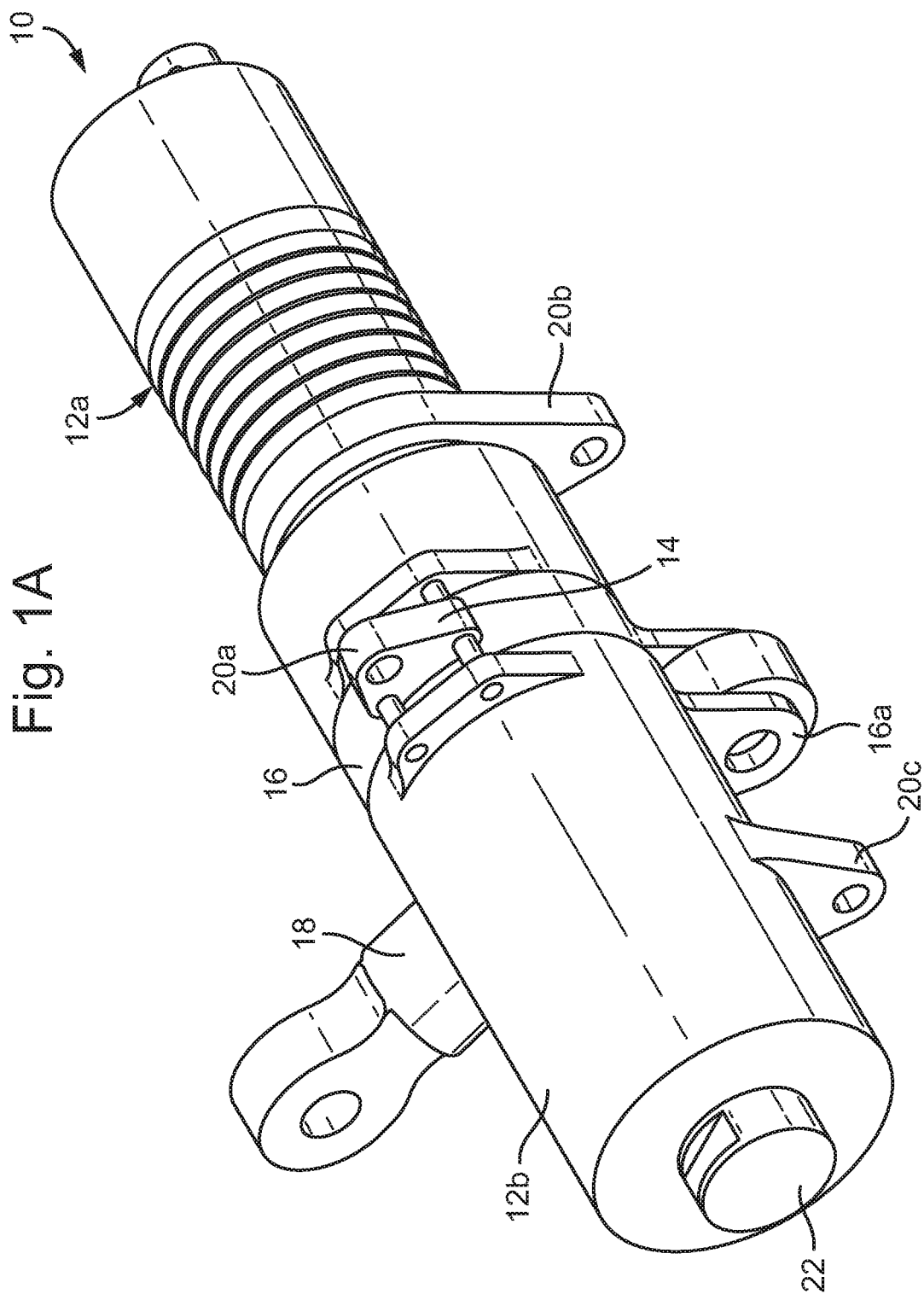

ELECTROMECHANICAL ACTUATOR

CROSS-REFERENCE TO RELATED APPLICATIONS

This application claims priority to European Patent Application No. 22305006.3 filed Jan. 6, 2022, the entire contents of which is incorporated herein by reference.

FIELD

The present disclosure relates to an electromechanical actuator.

BACKGROUND

Electromechanical actuators (EMAs) are used in a number of technical fields, including aerospace uses. EMAs are used in aircraft to move control surfaces. In one example, actuators (including hydraulic actuators as well as EMAs) are used to control a spoiler of an aircraft wing. Spoilers are typically held at a neutral position and then raised above the aircraft wing to provide braking and decrease lift. In recent years, the industry has called for the ability to additionally be able to lower the spoiler relative to the wing (i.e. relative to the neutral position), for use in high-lift situations or to close a large air gap that would otherwise exist between the spoiler and the wing flap when the wing flap is extended. The ability of an actuator to lower the spoiler below the wing is called a droop function of the actuator. It is desirable to provide an EMA having a droop function.

SUMMARY

According to a first aspect, the disclosure provides an electromechanical actuator, EMA, having a plurality of modes. The EMA comprises a housing; a motor fixed relative to the housing, the motor having an output shaft, the output shaft defining an axis of the EMA; a first sun gear connected for rotation with the output shaft; an output arranged to be driven by rotation of the first sun gear, wherein the output is arranged to have a neutral position and to be movable away from the neutral position within a positive quadrant and away from the neutral position within a negative quadrant; a ratchet comprising a ratchet wheel and a pawl; a torque limiter having a predetermined torque limit, wherein the torque limiter is arranged to limit torque transfer between the first sun gear and the output; a synchroniser comprising a first conical portion connected to an end of the output shaft, and a second conical portion connected to the ratchet wheel, wherein the synchroniser has an engaged position in which rotation of the first conical portion is transmitted to the second conical portion, and a disengaged position wherein the second conical portion is axially spaced apart from the first conical portion, along the axis, such that rotation of the first conical portion is not transmitted to the second conical portion; a solenoid mounted to a floating frame within the housing and connected to the second conical portion, the solenoid configured to pull the second conical portion along the axis away from the first conical portion when the solenoid is energised; and a spring arranged to bias the frame along the axis away from the first conical portion, wherein the frame abuts against a cam surface of the output. In an active mode of the plurality of modes, the solenoid is energised and rotation of the output shaft in either direction of rotation drives the output to rotate. In an anti-extension mode, the solenoid is not energised and, when the output is at the neutral position or in the positive quadrant, the output shaft is connected for rotation, via the synchroniser, to the ratchet, wherein the ratchet is arranged to prevent rotation of the output shaft in a predetermined direction of rotation. When the output is in the negative quadrant, the cam surface is in a position such that the frame is biased away from the first conical portion, along the axis, such that the second conical portion is axially spaced apart from the first conical portion both while the solenoid is energised and while the solenoid is not energised.

In this manner, the anti-extension mode is automatically disengaged while the output is in the negative quadrant. That is, regardless of whether or not the solenoid is energised, the ratchet is not connected to the motor shaft while the output is in the negative quadrant. When the output is in the neutral or positive quadrant, the anti-extension mode can be engaged or disengaged by controlling whether or not the solenoid is energised.

The first sun gear may engage a first set of planetary gears, and the first set of planetary gears may engage an intermediate ring-sun gear, and the intermediate ring-sun gear may engage with a second stage of planetary gears which engage the output, such that the output is connected to the first sun gear via the first set of planetary gears, the intermediate ring-sun gear, and the second stage of planetary gears.

This may provide a desired gear ratio between the motor and the output.

The torque limiter may be connected to the first set of planetary gears via at least a first stage fixed ring gear.

The torque limiter may be a ball detent torque limiter comprising a disk and a plurality of balls arranged on either side of the disk and spring-biased against the disk, wherein the balls engage respective detents formed in the disk. The force of the balls within their detents determines the predetermined torque limit, above which the balls will (temporarily) slip out of their detents, allowing the disk to turn to relieve torque. The torque limiter may therefore limit the maximum amount of torque delivered between the motor and the output. This may protect various components, e.g. the motor, the gears, or a flap/slat that the output connects to if there is a jam in the system.

The EMA may further comprise a maintenance mode in which a maintenance disk having a disk cam surface is moved to a turned position. In the turned position, the disk cam surface allows a floating surface, that is supporting one or more of the plurality of balls that are located on a first side of the disk, to move axially away from the disk of the torque limiter such that the predetermined torque value is reduced. This mode may effectively decouple the motor from the output by allowing an additional degree of freedom in the system of gears connecting between the motor and output. As such, (accidental) powering on of the motor does not cause rotation of the output in the maintenance mode, which may help protect a user e.g. maintenance worker. Further, this may allow a user, e.g. maintenance worker, to move the output by hand.

In one embodiment, the EMA, may further comprise a second sun gear mounted on the output shaft, wherein the second sun gear engages with a second set of planetary gears, and the second set of planetary gears engages with a first stage fixed ring gear, wherein the first stage fixed ring gear engages with the disk of the torque limiter, wherein the torque limiter holds the first stage fixed ring gear against rotation while a torque thereon remains below the predetermined limit.

The first stage fixed ring gear is typically held static by the torque limiter. While this is the case, this reduces the degrees of freedom in the gears connecting between the output shaft and the output, such that rotation of the output shaft (by the motor) causes rotation of the output. When the predetermined limit of the torque limiter is exceeded, the first stage fixed ring gear is (temporarily) no longer fixed against rotation and this introduces a further degree of freedom in the gearing between the output shaft and the motor. When this happens, rotation of the output shaft is not transmitted to the output and, similarly, movement of the output is not transmitted to the output shaft. This may protect various components if there is a jam in the system.

In this embodiment, an axle of each of the first set of planetary gears may extend through a centre of a respective one of the second set of planetary gears, such that the second set of planetary gears together forms a carrier for the first set of planetary gears.

Each gear of the first set of planetary gears may comprise a larger diameter gear portion that engages with the first sun gear and the intermediate ring-sun gear, and a smaller diameter portion that engages with the first stage fixed ring gear.

A position sensor may be provided for sensing a position of the output. This may allow a determination of whether the actuator is functioning properly (i.e. if the measured position matches the expected position based on the control of the motor etc.)

The EMA may comprise one or more engagement springs arranged to bias the second conical portion towards the first conical portion. When the solenoid is disengaged, these engagement springs may bias the second conical portion to engage the first conical portion, and thereby engage the anti-extension mode.

The torque limiter may be disposed around the axis and radially outward from the synchroniser. This may provide a compact actuator arrangement.

According to a second aspect, there is provided a method of using the EMA of the first aspect. The method comprises operating the EMA in one of the active mode, the anti-extension mode, and a maintenance mode. Operating the EMA in the active mode includes energising the solenoid such that the second conical portion is not in contact with the first conical portion; and operating the motor to rotate the output shaft in either direction of rotation to drive the output in rotation. Operating the EMA in the anti-extension mode includes turning off power from the solenoid such that, in the neutral position or positive quadrant, the second conical portion is connected to the first conical portion and the ratchet thereby prevents rotation of the output shaft in one direction of rotation; and wherein operating the EMA in the maintenance mode includes turning, by an operator, a maintenance disk to reduce the predetermined torque on the torque limiter, such that rotation of the motor shaft under drive from the motor is not transmitted to the output.

BRIEF DESCRIPTION OF THE DRAWINGS

Certain embodiments of the present disclosure will now be described in greater detail by way of example only and with reference to the accompanying drawings in which:

FIG. 1A shows a perspective view of an electromechanical actuator (EMA);

DETAILED DESCRIPTION

Figure 1B:
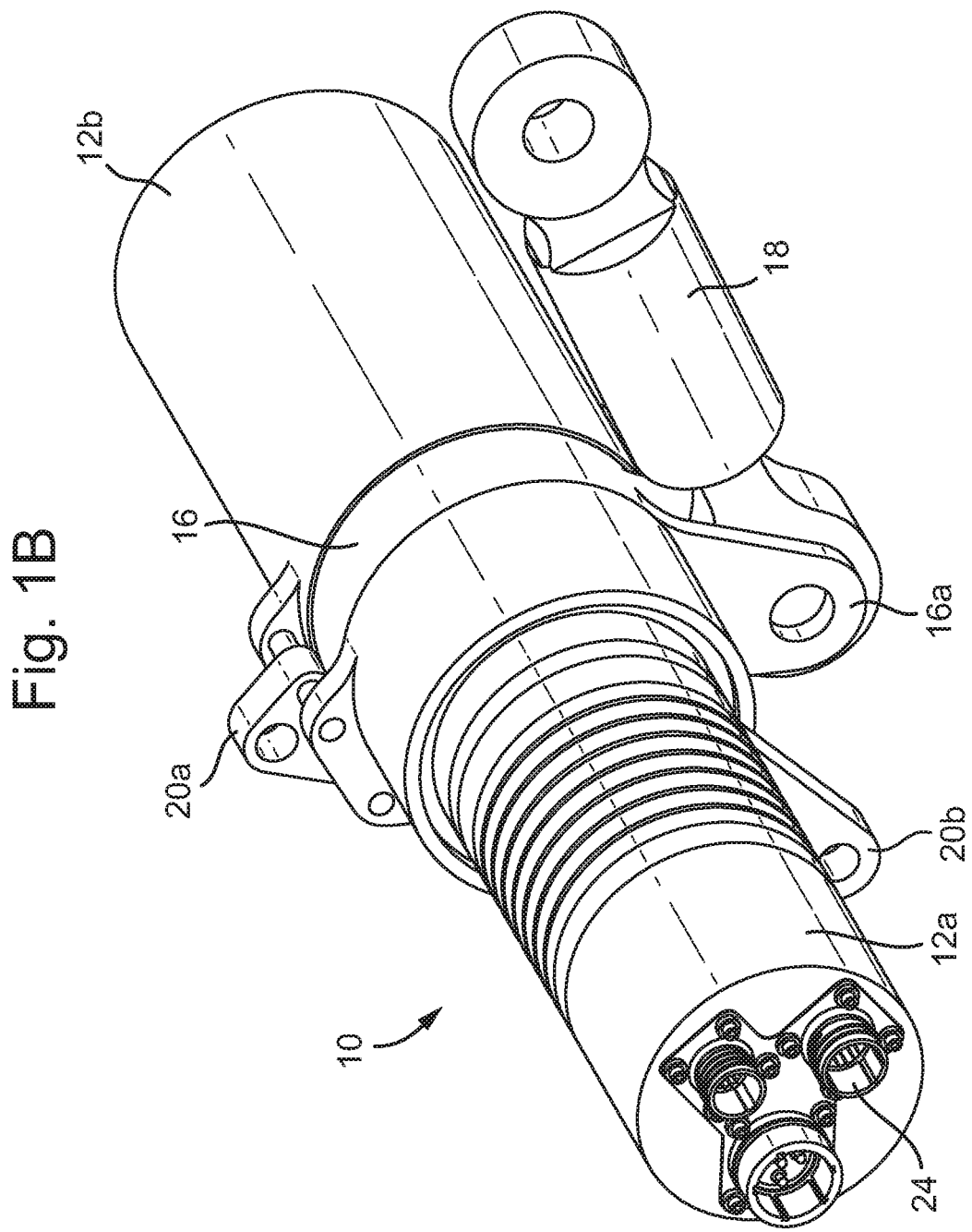
FIG. 1B shows a perspective view of the EMA of FIG. 1 from a different angle.

FIG. 1A shows a perspective view of an electromechanical actuator (EMA) 10. The EMA has a housing comprising a first housing portion 12a and a second housing portion 12b. The first and second housing portions 12a,b are connected together by a connector 14. A rotational output 16 is located between the two housing portions 12a,b and the rotational output 16 connects to a connecting rod 18. The output 16 has a connection portion 16a where it may connect to the rod 18. The connecting rod 18 may connect, for example, to an aircraft spoiler (not shown). As described in detail below, rotation of the rotational output 16 moves the connecting rod 18 and thereby can effect movement of the spoiler. The EMA 10 has a maintenance cover 22 extending out of the housing.

Figure 2A:
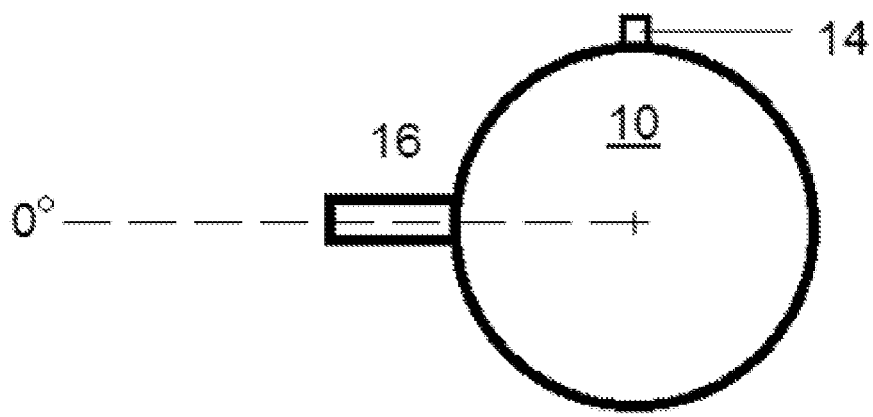
FIGS. 2A-2C show, respectively, the neutral position and the positive and negative quadrants of motion available to the EMA.
Figure 2B:
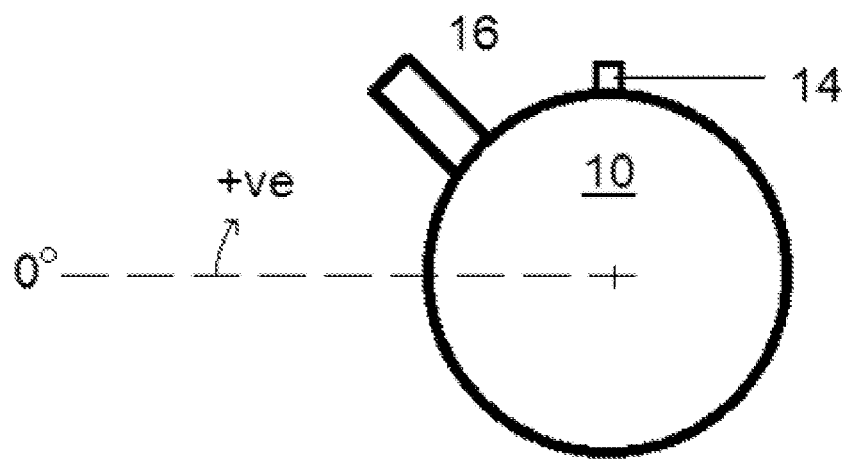
Figure 2C:
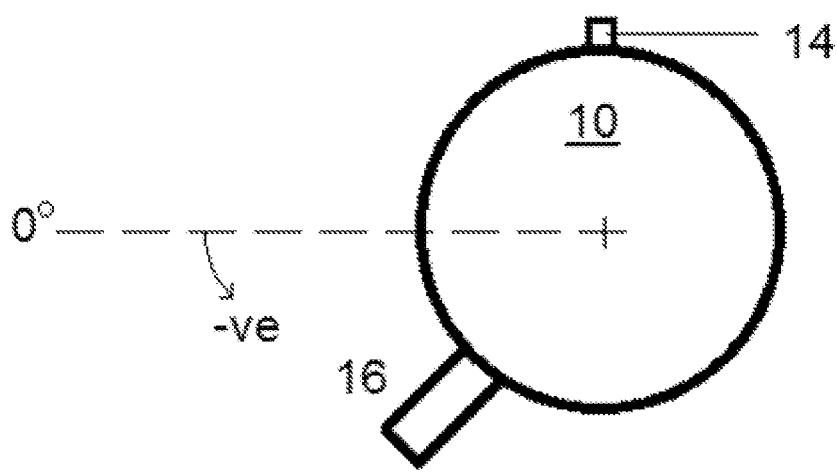

FIGS. 2A-2C show an end-on view of the EMA 10 with the output 16 at different angular positions. The output 16 has a range of rotation defined between two extreme ends of rotational motion. A neutral position, shown as 0° in each of FIGS. 2A-C, is defined at some predetermined point between the two extremes of rotation. In use, the EMA is arranged such that the neutral position of the EMA corresponds to a neutral position of the spoiler that the EMA 10 controls (e.g. a position for level-flight of the aircraft). When the output 16 is moved in a first direction, termed a positive direction and indicated by the arrow in FIG. 2B, away from the neutral position, the spoiler raises. The entire angular range between the neutral position and the extreme range of motion in the positive direction may be termed the positive quadrant. However, note that the positive quadrant is not limited to covering exactly 90°, and may be larger than or smaller than this value.

When the output is moved away from 0° in a second direction, opposite the positive direction, and termed a negative direction and depicted by the arrow in FIG. 2C, the spoiler lowers to a droop position. The angular range between the neutral position and the extreme range of motion in the negative direction may be termed the negative quadrant. Again, the negative quadrant does not necessarily span exactly 90°, and may be larger or smaller than this value.

As described in detail below, the EMA provides three different modes of operation. These are an active mode, an anti-extension mode, and a maintenance mode. The EMA is capable of providing a droop function in the anti-extension mode.

In the active mode, the EMA 10 is free to move the output 16 in either direction in both the positive and negative quadrants. The positive direction in the positive quadrant correlates with increasing extension of the spoiler above the wing, when the EMA is in use as a spoiler actuator in an aircraft.

In the anti-extension mode, when the output 16 is in the positive quadrant, the output 16 is held such that the output may only move in the negative direction so as to return from an extended position towards the neutral position (e.g. under forces provided by a motor in the actuator), but is prevented from moving further in the positive direction.

If the output 16 is positioned in the negative quadrant, the droop mode is automatically engaged—as explained in greater detail below—and the EMA can move the output 16 in the positive direction (e.g. under drive from the motor) so as to return to the neutral position, but no further. The anti-extension mode may be used, for example, where a failure is detected, e.g. in a spoiler that is connected to the output.

In the maintenance mode, a motor of the EMA no longer drives the output 16 for movement and a ratchet is disengaged to allow free movement of the output e.g. by a maintenance worker turning the output by hand. Thus, even if the motor is (accidentally) activated, the output 16 will not move.

The droop function is automatically engaged when the EMA output is in the negative quadrant. The droop function automatically disengages when the output is at the neutral position or is in the positive quadrant.

The housing has a plurality of connection points 20 a,b,c at which the EMA 10 may be connected to a frame, such as an aircraft frame (not shown).

FIG. 1B shows a different perspective view of the EMA 10 of FIG. 1A. In addition to those parts already discussed above, FIG. 1B shows an electrical connector 24 by which electrical power may be supplied to the EMA 10.

Figure 3:
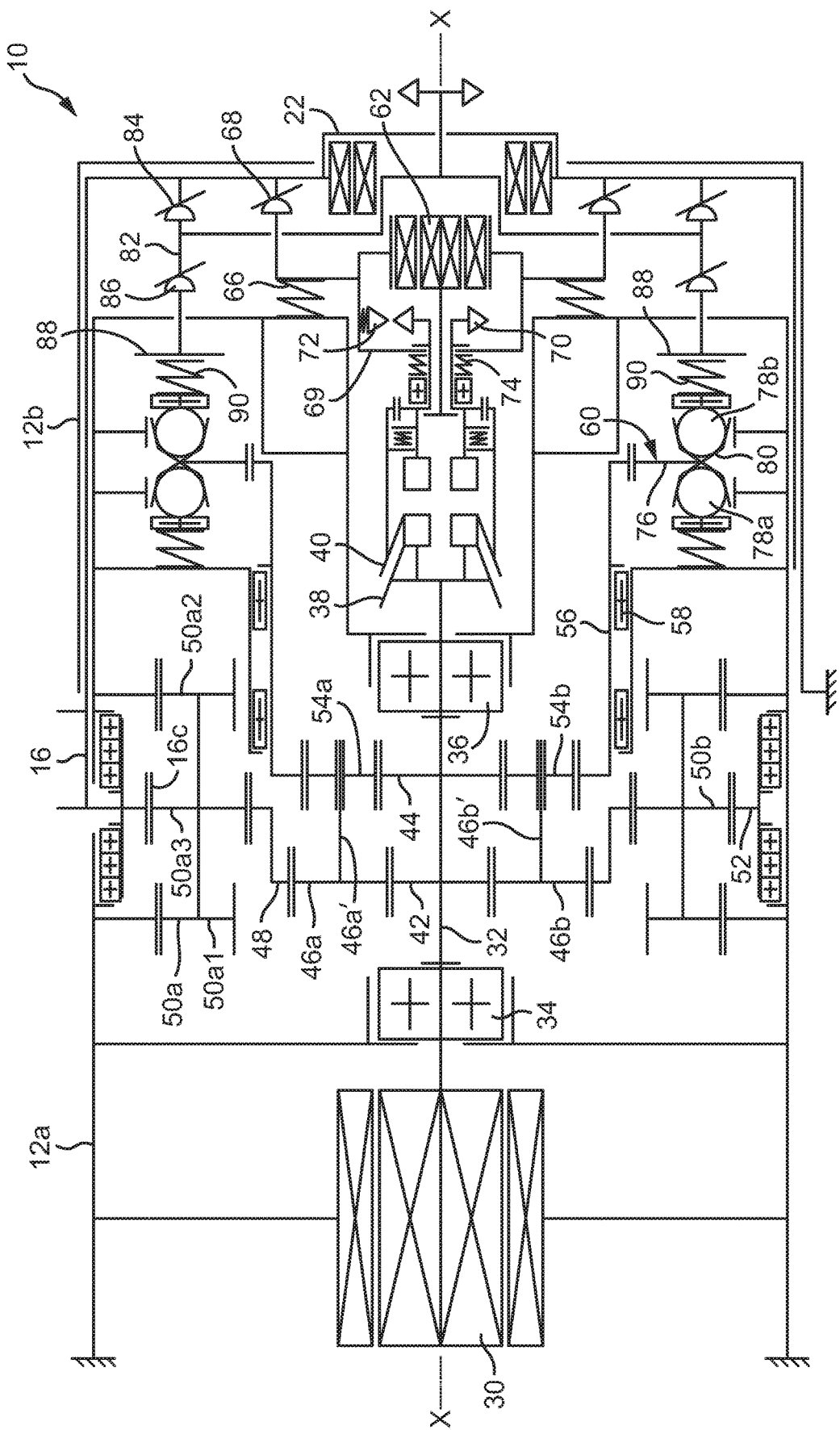
FIG. 3 shows a cross-sectional schematic of the EMA.
Figure 4:
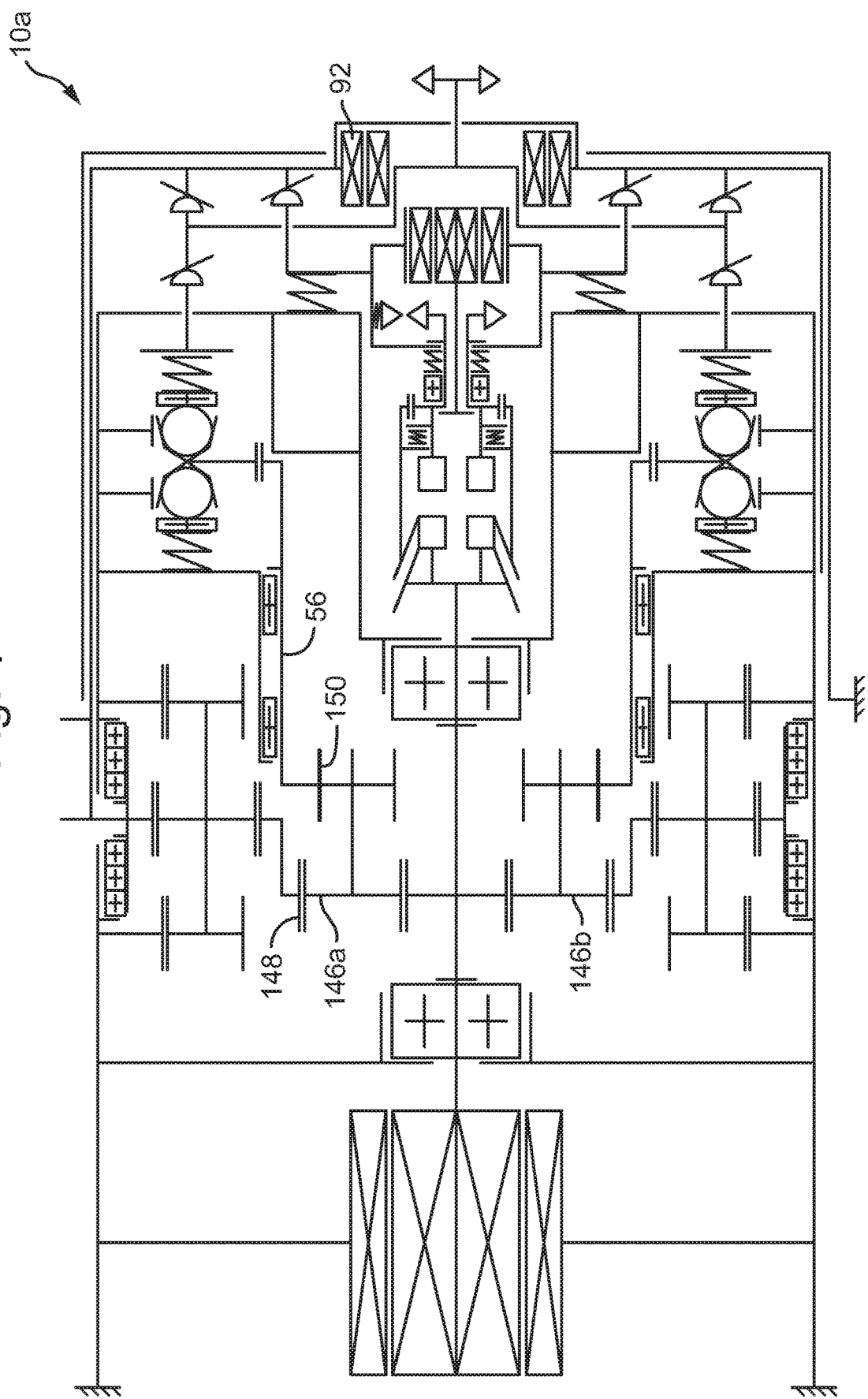
FIG. 4 shows a cross-sectional schematic of an alternative EMA design.

FIG. 3 shows a cross-sectional schematic of the EMA 10. FIG. 4 shows a cross-sectional schematic of an alternative EMA 10a. The EMA 10 of FIG. 3 is identical to the EMA 10a of FIG. 4, except for a portion of the gearing system, as described below. Where the two EMAs 10,10a have like parts, like reference numerals will be used.

The EMA 10 of FIG. 3 comprises a motor 30 that is fixed relative to the housing. For example, the motor 30 may be fixed inside the first housing portion 12a and in electrical communication with the electrical connector 24. The motor 30 has an output shaft 32. The output shaft 32 extends along an axis X and this axis defines a main axis of the EMA 10.

The output shaft 32 is supported by and extends through a first bearing 34 and is supported by and extends through a second bearing 36. The output shaft terminates in a conical portion 38 that forms part of a synchronizer, described below.

Between the first and second bearings 34,36, a first sun gear 42 is fixedly mounted to the output shaft 32 and a second sun gear 44 is fixedly mounted to the output shaft 32.

The first sun gear 42 connects to a first set of planetary gears 46a,b that are disposed radially outward from, and engaged with, the first sun gear 42.

An intermediate ring-sun gear 48 is disposed radially outward from, and engages with, the first set of planetary gears 46a,b.

A set of second stage planetary gears 50a,b are disposed radially outward from, and engage with, the intermediate ring-sun gear 48.

The intermediate ring-sun gear 48 is so called because it forms the ring gear for the epicyclic (or planetary) gear system defined by the first sun gear 42 and the first set of planetary gears 46a,b, while it simultaneously acts as the sun gear for the epicyclic (or planetary) gear system defined by the second stage of planetary gears 50a,b and the output (which constitutes the "ring gear" of that system).

The secondary stage planetary gears 50a,50b interface with radially-inwardly facing teeth 16b of the output 16. Rotation of the second stage planetary gears 50a,50b causes rotation of the output 16 relative to the housing.

Each of the gears 50a,b of the second stage planetary gears may have a larger-diameter middle portion 50a3 that engages with teeth of the intermediate ring-sun gear 48 and with the teeth 16c of the output 16. The gear has first 50a1 and second 50a2 smaller-diameter portions disposed either side of the middle portion 50a3 and these both engage with radially-inwardly facing teeth 12c formed in the housing.

The second sun gear 44 connects to a second set of planetary gears 54a,b that are disposed radially outward from, and engaged with, the second sun gear 44.

A first stage fixed ring gear 56 is disposed radially outward from, and engaged with, the second set of planetary gears 54a,b. The first stage fixed ring gear 56 is supported relative to the housing by a bearing 58. As described in detail below, the first stage fixed ring gear 56 is, during normal operation, held against rotation by a torque limiter 60.

Each gear 46a,b, of the first set of planetary gears has an axle 46a',46b' that extends through a center of a respective one of the second set of planetary gears 54a,b. The second set of planetary gears 54a,b therefore collectively function as the carrier for the first set of planetary gears, within the epicyclic gear system defined by the first sun gear 42, first set of planetary gears 46a,b, and the intermediate ring-sun gear 48.

The first sun gear 42 has a smaller diameter than the second sun gear 44. Each of the gears of the second set of planetary gears 54a,b has a smaller diameter than each of the gears of the first set of planetary gears 46a,b. The inner diameter of the intermediate ring-sun gear 48 (i.e. where this gear 48 engages first set of planetary gears 46a,b) may be substantially equal to an inner diameter of the first stage fixed ring gear 56 (i.e. where this gear 58 engages the second set of planetary gears 54a,b. Alternatively, the inner diameter of the first stage fixed ring gear 56 may be smaller than the inner diameter of the intermediate ring-sun gear 48. The relative diameters selected for the various gears may be any value, subject to the constraint that the distance between a center of the first sun gear 42 and a center of a gear 46a of the first set of planetary gears is equal to the distance between a center of the second sun gear 44 and the center of a gear 54a of the second set of planetary gears. This constraint is so that the axles 46a',46b' of the planetary gears of the first set of planetary gears 46a,b can extend through the centers of the respective gears of the second set of planetary gears 54a,b.

During operation in the active mode, the motor 30 turns the output shaft 32. The output shaft turns the first 42 and second sun gears 44. As the first stage fixed ring gear 56 is normally held static by the torque limiter 60, the rotation of the second sun gear 44 causes the second set of planetary gears 54a,b to move around the axis X of the output shaft 32. As the axes 46a',46b' of the gears of the first set of planetary gears 46a,b are mounted in the second set of planetary gears, the first set of planetary gears also moves about the axis X of the output shaft. The first set of planetary gears 46a,b are also driven to rotate about their respective axes by the rotation of the first sun gear 42.

These respective rotations combine to a predetermined gear ratio such that the intermediate ring-sun gear 48 rotates at a predefined fraction of the rotational speed of the output shaft 32.

Rotation of the intermediate ring-sun gear 48 causes the gears of the second stage planetary gears 50a,b to rotate and, via their engagement with the teeth 12c of the housing, these gears move around the axis X of the output shaft 32. The larger-diameter middle portion 50a3 engages the teeth 16c of the output 16 and this drives rotation of the output 16.

While the torque limiter 60 is engaged, i.e. while torque between the output 16 and the first sun gear 42 is below a predetermined value, the first stage fixed ring gear 56 is held against rotation. Feedback forces acting on the output 16 (e.g. from a spoiler that is being driven by the EMA 10) will be reacted, via the various gears, into the first stage fixed ring gear 56. If the feedback forces exceed the predetermined value, the torque limiter 60 will allow slipping rotation of the first stage fixed ring gear 56, to relieve the torque. This may prevent damage to the motor 32 and other gears. When the torque drops below the predetermined value, the torque limiter ceases to slip in rotation and is held again against rotation.

As described in greater detail below, in the maintenance mode, the torque limiter 60 is disengaged such that it does not resist rotation of the first stage fixed ring gear 56. This provides a new degree of freedom in the gearing of the EMA 10 such that, when the torque limiter 60 is disengaged, rotation of the output shaft 32 does not result in rotation of the output 16. This is because, with the additional degree of freedom, there is no net torque on the intermediate ring-sun gear 48 in this case.

The operation of the anti-extension mode will now be described. In this mode, while the output is in the positive quadrant, the output 16 may only be driven by the motor 30 in the negative direction, back towards the neutral position.

As mentioned previously, the output shaft 32 terminates in a conical portion 38. This faces a second conical portion 40, and the two conical portions 38,40 together act as a synchronizer. During the active mode, the second conical portion 40 is held apart from the first conical portion by a solenoid 62. The solenoid 62 is mounted in a frame 64. The frame 64 is fixed against rotation relative to the housing. The frame may 64 may be fixed against rotation by splines, for example. A spring 66 is disposed between the housing and the frame 64 to bias the frame 64 in a direction axially away from the first conical portion 32. On the other side, the frame 64 engages a cam surface 68 of the output 16. Thus, depending on the current rotational position of the output 16 relative to the frame, the spring 66 is more or less compressed and, correspondingly, the frame 64 is held at a different position within the housing. That is, the cam surface 68 of the output 16 is such that, in the negative quadrant, the cam surface is further away from the first conical portion 38 along the axis X. This allows the frame 64, under bias from the spring 66, to move away from the first conical portion 38 and thereby the second conical portion 40 is spaced apart from the first conical portion 38 regardless of whether the solenoid 62 is engaged or disengaged.

In the neutral position or in the positive quadrant, the cam surface 68 of the output 16 is spaced closer towards the first conical portion 38 along the axis X. In this position, engagement or disengagement of the first and second conical portions 38,40 is determined by whether the solenoid 62 is energised or not.

While the output 16 is at the neutral position or in the positive quadrant, then when the solenoid 62 is not energised, engagement springs 74 move the second conical portion 40 away from the frame 64, along the axis X, and into engagement with the first conical portion 38. When the first 38 and second 40 conical portions are engaged, rotation of the output shaft 32 is transmitted through the first conical portion 38 to cause the second conical portion to rotate. A second end of the second conical portion 40 forms a ratchet comprising a ratchet gear 70 that engages with a pawl 72 that is fixed to the frame 64. The pawl 72 ensures that the ratchet gear 70 may only rotate in one direction of rotation.

As such, when the conical portions 38,40 are engaged, the output shaft is able to freely move in a first direction of rotation (e.g. under drive from the motor 30), but is prohibited from rotation in the opposite direction by the ratchet.

The ratchet is arranged such that the prohibited-direction of rotation of the ratchet gear 70 corresponds to an extension direction of the output 16. Thus, the ratchet gear 70 and pawl 72 provide an anti-extension capability for the EMA 10.

When the output 16 is in the negative quadrant, the second conical portion 40 is always spaced from the first conical portion 38, such that the second conical portion 40 cannot contact the first conical portion 38, regardless of whether the solenoid 62 is energised or not. In this manner, the anti-extension function is automatically disengaged while the output 16 is in the negative quadrant.

In the maintenance mode, a user (e.g. maintenance worker) reaches through the cover 22 (e.g. with a tool) and rotates a maintenance disk 82, which maintenance disk 82 is described in more detail below. During normal operation, when the maintenance mode is not engaged, the disk 82 does not rotate (e.g. relative to connector 14) when the output 16 rotates. That is, the disk 82 is only rotated relative to the connector 14 when a maintenance worker rotates it e.g. using a tool.

The torque limiter 60 is a ball detent type of torque limiter. That is, the torque limiter 60 comprises a disk 76 having a plurality of detents 80 in its front and rear axial faces. Ball bearings 78*a,b* are spring-biased into respective detents 80. When torque is applied to the disk 76, the ball bearings sitting in their detents prevent rotation of the disk 76. When an excessively large torque is applied to the disk 76, greater than a predetermined torque value, the ball bearings 78*a,b* ride up out of their respective detents 80 and allow rotation of the disk 76. As the disk 76 rotates, each ball bearing will attempt (due to the spring bias) to sit back in the next detent that is brought into alignment with that ball bearing. If the torque remains high, the disk 76 will continue to turn. When the torque drops below a threshold value (i.e. below the torque limit of the torque limiter 60) the spring-bias on the ball bearings 78*a,b* is sufficient to press the ball bearings back firmly into a respective detent 80 and prevent further rotation of the disk 76.

The disk 82 bears against a surface 84 of the output 16. The surface 84 is formed radially outward of the cam surface 68. On a side opposite the surface 84, the disk 82 has a cam surface 86. When the disk 82 is in its normal position (relative to the output 16), it supports, the disk cam surface 86, a floating surface 88. A spring 90 of the torque limiter is compressed between a given ball bearing 78*b* and the surface floating 88. The spring 90 therefore determines the torque limit of the torque limiter 60. When the disk 82 is rotated relative to the output 16, e.g. by a maintenance worker using a tool, the movement of the disk cam surface 86 allows the floating surface 88 supporting the spring 90 to move axially away from the disk 76 of the torque limiter 60. This substantially reduces the torque limit of the torque limiter 60 such that the first stage fixed ring gear 56 is essentially free to rotate. As described above, rotation of the first stage fixed ring gear 56 has the result that the output 16 is not driven by rotation of the output shaft 32.

The operation in the droop function will now be described. The droop function automatically activates when the output is in the negative quadrant. Thus, the droop function may occur when the EMA is working in the active mode, when motion in either direction is permitted or when the EMA is in the anti-extension mode, i.e. when the solenoid 62 is not energized and so the first and second 38,40 conical portions would normally be engaged and thus the ratchet gear 70 would be connected for rotation with the output shaft 32.

As mentioned previously, the frame 64 is held in its place relative to the housing via a spring 66 and a cam surface 68 of the output 16. When the output 16 is in the negative quadrant, the cam surface 68 acts to allow the frame 64 to move away from the first conical portion 38, such that the synchronizer disengages. When the first and second conical portions 38, 40 are thus disengaged, the output shaft 32 is disconnected from the ratchet gear 70, despite the solenoid 62 remaining unenergised. Thus, the anti-extension effect is temporarily disengaged and the output 16 is free to turn in either the positive or negative direction, within the negative quadrant.

Put another way, the cam surface 68 is formed such that, when the output 16 is at the neutral position or anywhere in the positive quadrant, the frame 64 is held such that the engagement or disengagement of the synchronizer is entirely controlled by whether the solenoid is energized or not. The cam surface 68 is further formed such that, whenever the output is in the negative quadrant, the frame 64 pulls away from the first conical portion 38 (i.e. moves to the right in the orientation shown in FIGS. 2 and 3), such that the second conical portion 40 is held spaced apart from the first conical portion 38 regardless of whether the solenoid 62 is energized or not.

A position sensor 92 is connected to the plate 82 (which does not rotate relative to the housing during operation of the EMA 10) and the position sensor 92 is arranged to measure a rotational position of the output 16. The position sensor 92 is mounted to a cover 22 that connects to the housing. As shown in FIG. 3, the cover 22 has a hole therethrough, allowing a maintenance worker to access the disk 82. The measured rotational position may be output to a controller (now shown) controlling operation of the EMA 10. The same controller may control the motor 30.

During operation the output 16 may move through a total angle of approximately 200 degrees. That is, the output 16 does not rotate fully around the EMA. As may be seen in FIG. 1, the connection portion 16a of the output 16 would be prevented from moving past the connector 14 that connects the first and second housing portions 12a,b.

Turning now to the alternative design of EMA 10a shown in FIG. 4. This EMA 10a is identical in most respects to the EMA 10 described hereinabove. Further, the operation of the anti-extension mode, the droop mode, and the maintenance mode in the alternative EMA 10a are identical to these modes in the EMA 10 described hereinabove in relation to FIG. 3. The sole difference lies in the gearing system connecting the output shaft 32 of the motor 30 to the output 16.

Specifically, the EMA 10a does not have the second sun gear 44. Further, the first set of planetary gears 46a,b and the second set of planetary gears 54a,b of the first EMA 10 design are here replaced by alternative components. The alternative components are a set of planetary gears 146a, 146b. Each planetary gear 146a,b comprises a larger diameter gear portion 148 and a smaller diameter gear portion 150.

The larger diameter gear portion 148 engages with, on a first side, the first sun gear 42 and, on a second side, with the intermediate ring-sun gear 48. That is, the first sun gear 42 is radially inward from, and engaged with, each of the gears 146a,b, and the intermediate ring-sun gear is radially outward from, and engaged with, each of the gears 146a,b.

The smaller diameter gear portion 150 engages with the first stage fixed ring gear 56. The first stage fixed ring gear 56 is radially outward from each of the gears 146a,b.

Each gear 146a,b may be formed as a monolithic item, or may be formed from connecting two gear portions together such that they rotate together.

In this second design on EMA 10a, the load path from the output shaft 32 to the first stage fixed ring gear 56 passes through the first sun gear 42 and the compound planetary gears 146a,b. By contrast, in the previous EMA 10 design, there was a load path from the output shaft 32 to the first stage fixed ring gear 56 that passed through the second sun gear 44 and the second set of planetary gears 54a,b.

In all other respects, the operation of the EMA of FIG. 4 is the same as described hereinabove in relation to FIGS. 1-3. That is, when the output 16 is in the negative quadrant, the droop function is automatically engaged such that the output 16 may be rotated in either direction, regardless of whether or not the solenoid is energized. Put another way, the anti-extension function is automatically disengaged when the output 16 is in the negative quadrant.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electromechanical actuator, EMA, having a plurality of modes, the EMA comprising:
   a housing;
   a motor fixed relative to the housing, the motor having an output shaft, the output shaft defining an axis (X) of the EMA;
   a first sun gear connected for rotation with the output shaft;
   an output arranged to be driven by rotation of the first sun gear, wherein the output is arranged to have a neutral position and to be movable away from the neutral position within a positive quadrant and away from the neutral position within a negative quadrant;
   a ratchet comprising a ratchet wheel and a pawl;
   a torque limiter having a predetermined torque limit, wherein the torque limiter is arranged to limit torque transfer between the first sun gear and the output;

a synchroniser comprising a first conical portion connected to an end of the output shaft, and a second conical portion connected to the ratchet wheel, wherein the synchroniser has an engaged position in which rotation of the first conical portion is transmitted to the second conical portion, and a disengaged position wherein the second conical portion is axially spaced apart from the first conical portion, along the axis (X), such that rotation of the first conical portion is not transmitted to the second conical portion;

a solenoid mounted to a floating frame within the housing and connected to the second conical portion, the solenoid configured to pull the second conical portion along the axis (X) away from the first conical portion when the solenoid is energised; and a spring arranged to bias the frame along the axis (X) away from the first conical portion, wherein the frame abuts against a cam surface of the output;

wherein, in an active mode of the plurality of modes, the solenoid is energised and wherein rotation of the output shaft in either direction of rotation drives the output to rotate;

wherein in an anti-extension mode, the solenoid is not energised and, when the output is at the neutral position or in the positive quadrant, the output shaft is connected for rotation, via the synchroniser, to the ratchet, wherein the ratchet is arranged to prevent rotation of the output shaft in a predetermined direction of rotation; and wherein when the output is in the negative quadrant, the cam surface is in a position such that the frame is biased away from the first conical portion, along the axis (X), such that the second conical portion is axially spaced apart from the first conical portion both while the solenoid is energised and while the solenoid is not energised.

2. The EMA of claim 1, wherein the first sun gear engages a first set of planetary gears, wherein the first set of planetary gears engages an intermediate ring-sun gear, wherein the intermediate ring-sun gear engages with a second stage of planetary gears, which engage the output, such that the output is connected to the first sun gear via the first set of planetary gears, the intermediate ring-sun gear, and the second stage of planetary gears.

3. The EMA of claim 2, wherein the torque limiter is connected to the first set of planetary gears via at least a first stage fixed ring gear.

4. The EMA of claim 1, wherein the torque limiter is a ball detent torque limiter comprising a disk and a plurality of balls arranged on either side of the disk and spring-biased against the disk, wherein the balls engage respective detents formed in the disk.

5. The EMA of claim 4, further comprising:

a maintenance mode in which a maintenance disk having a disk cam surface is moved to a turned position, wherein, in the turned position, the disk cam surface allows a floating surface supporting one or more of the plurality of balls that are located on a first side of the disk to move axially away from the disk of the torque limiter such that the predetermined torque value is reduced.

6. The EMA of claim 3, further comprising:

a second sun gear mounted on the output shaft, wherein the second sun gear engages with a second set of planetary gears, and the second set of planetary gears engages with a first stage fixed ring gear, wherein the first stage fixed ring gear engages with the disk of the torque limiter, wherein the torque limiter holds the first stage fixed ring gear against rotation while a torque thereon remains below the predetermined limit.

7. The EMA of claim 6, wherein an axle of each of the first set of planetary gears extends through a centre of a respective one of the second set of planetary gears, such that the second set of planetary gears together forms a carrier for the first set of planetary gears.

8. The EMA of claim 5, wherein each gear of the first set of planetary gears comprises a larger diameter gear portion that engages with the first sun gear and the intermediate ring-sun gear, and a smaller diameter portion that engages with the first stage fixed ring gear.

9. The EMA of claim 1, further comprising:

a position sensor for sensing a position of the output.

10. The EMA of claim 1, comprising one or more engagement springs arranged to bias the second conical portion towards the first conical portion.

11. The EMA of claim 1, wherein the torque limiter is disposed around the axis (X) and radially outward from the synchroniser.

12. A method of using the EMA of claim 1, the method comprising:

operating the EMA in one of the active mode, the anti-extension mode, and a maintenance mode;

wherein operating the EMA in the active mode includes energising the solenoid such that the second conical portion is not in contact with the first conical portion; and operating the motor to rotate the output shaft in either direction of rotation to drive the output in rotation;

wherein operating the EMA in the anti-extension mode includes turning off power from the solenoid such that, in the neutral position or positive quadrant, the second conical portion is connected to the first conical portion and the ratchet thereby prevents rotation of the output shaft in one direction of rotation; and wherein operating the EMA in the maintenance mode includes turning, by an operator, a maintenance disk to reduce the predetermined torque on the torque limiter, such that rotation of the motor shaft under drive from the motor is not transmitted to the output.

* * * * *